FREQUENCY CONTROL APPARATUS

Filed Sept. 19, 1950 3 Sheets-Sheet 1

INVENTOR
Eugene O. Keizer
BY
Olin V. Mitchell
ATTORNEY

INVENTOR
Eugene O. Keizer
BY
Ohin D. Mitchell
ATTORNEY

INVENTOR
Eugene O. Keizer
BY Olin V. Mitchell
ATTORNEY

Patented Jan. 12, 1954

2,666,182

UNITED STATES PATENT OFFICE 2,666,182

FREQUENCY CONTROL APPARATUS

Eugene O. Keizer, Princeton, N. J., assignor to Radio Corporation of America, a corporation of Delaware Application September 19, 1950, Serial No. 185,627

5 Claims. (Cl. 332—28)

This invention relates to apparatus for controlling the frequency of an oscillator in response to a desired signal.

The frequency of an oscillator has been generally controlled by a reactance tube placed in parallel with at least a portion of the resonant circuit of the oscillator. A portion of the output of the oscillator is fed back to the control grid of the reactance tube at a 90° phase angle with respect to the voltage appearing across the resonant circuit associated with the oscillator. Thus, the reactance tube may draw either leading or lagging current and act as a capacitance or inductance placed in parallel with the resonant circuit. Variations in the magnitude of the reactive current drawn by the reactance tube are controlled in accordance with any desired signal.

In the apparatus of the prior art, however, the feedback from the oscillator output to the grid of the reactance tube is generally affected by a phase splitting network. The voltage applied to the grid of the reactance tube in such arrangements is generally relatively small due to the voltage divider action of the phase splitter. This impairs the sensitivity of the device to such an extent that in normal arrangements requiring high sensitivity the reactance tube must have considerably more gain than the oscillator tube itself.

It is accordingly an object of the present invention to provide a means for controlling the frequency of an oscillator with a maximum sensitivity.

It is another object of this invention to provide an improved means and method whereby the voltage which is fed back from an oscillator to a reactance tube associated with the oscillator is derived in such manner that the frequency control effected by the reactance tube has a maximum sensitivity.

In the frequency control circuits of the prior art wherein the gain of a reactance tube is changed to effect a change in the oscillator frequency, the current drawn by the reactance tube generally has a slightly resistive component. The magnitude of this resistive component varies with the change in gain of the reactance tube produced by the desired control signals and therefore introduces an amplitude modulation in the output of the oscillator that is a function of the control voltage applied to the reactance tube.

It is accordingly another object of this invention to provide novel means and apparatus whereby the frequency of an oscillator may be controlled in a simple manner without affecting its amplitude.

Briefly, the objectives noted above can be achieved in accordance with the principles of this invention wherein the voltage applied to control electrode of the reactance tube is derived from a reactance in series with at least a portion of the plate current drawn by the oscillator through the normal oscillator circuits. It will become apparent from a detailed discussion to follow that this not only permits the application of a relatively greater voltage to the reactance tube so as to increase the sensitivity of its control, but also that this arrangement makes it possible to carefully eliminate all resistive components of the current drawn by the reactance tube and therefore eliminate any amplitude variations in the output of the oscillator that would otherwise be caused by changes in the frequency control voltage.

The way in which the above objects and advantages may be effected in accordance with the principles of this invention may be more clearly understood from a detailed consideration of the drawings in which.

Figure 1:
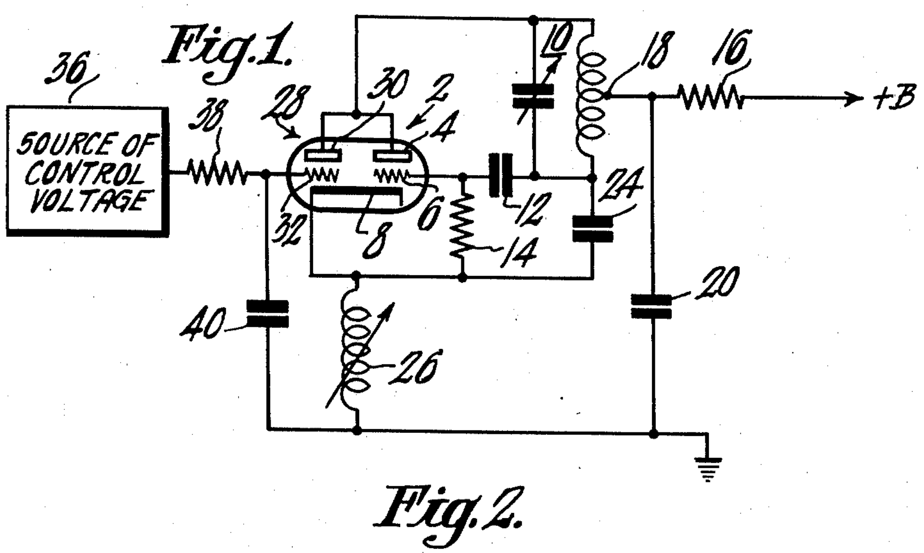
Figure 1 illustrates the application of the principles of this invention to a Hartley oscillator wherein the cathode is maintained at R. F. potential with respect to ground.

In Figure 1 there is shown a standard Hartley oscillator comprised of a first amplifier generally indicated by the number 2 having a plate 4, a grid 6 and a cathode 8. A parallel resonant circuit 10 is connected between the plate 4 and the grid 6. The lower end of the parallel resonant circuit is coupled to the grid 6 via a coupling condenser 12 and a grid leak resistor 14 that is connected between the grid 6 and the cathode 8. A B+ potential of suitable magnitude is applied to the plate 4 through an isolating resistor 16 and a tap 18 that is at an intermediate point of the inductive branch of the tank circuit 10.

The cathode 8 is generally coupled to the intermediate point 18. In the particular arrangement of Figure 1, the coupling would normally be accomplished by a condenser 20 connected directly between the cathode 8 and the intermediate point 18 so as to prevent the B+ voltage from being grounded.

In accordance with accepted practice, a second amplifier 28 having at least a plate 30, a grid 32 and a common cathode 8 is connected in parallel with at least a portion of the resonant circuit 10. In this particular arrangement the plate 30 of the second amplifier 28 is connected to the plate 4 of the first amplifier 2. The voltage wave that is to be used for controlling the frequency of the oscillator is supplied by a source 36 via an isolating resistor 38 to the grid 32.

In accordance with this invention, however, the connection between the cathode 8 and the intermediate point in the tank circuit 18 includes a variable inductance 26 in series with the bypass condenser 20. In addition, the grid 6 is coupled to the cathode 8 by a reactive impedance which in this particular figure is shown to be a condenser 24. The junction of the inductance 26 and the condenser 20 is grounded. The grid 32 is coupled to the junction of the inductance 26 and the bypass condenser 20 via a condenser 40.

Figure 2:
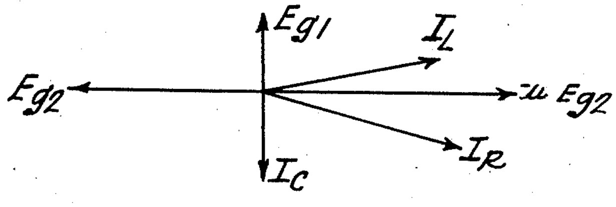
Figure 2 is a vector diagram that is useful in explaining the operation of this invention as applied to a Hartley oscillator.

The operation of Figure 1 will now be explained in connection with Figure 2 wherein the vector $E_{g2}$ represents the voltage applied between the grid 6 and the cathode 8 of the oscillator amplifier 2. Due to the phase inversion of the normal amplifier the voltage appearing at the plate 4 may be represented by the vector $-\mu E_{g2}$. It has been theoretically and practically determined that the current flowing through the amplifier tube of a Hartley oscillator lags the voltage across the tank circuit. This current is indicated therefore by the lagging vector $I_R$. The current flowing to the cathode 8 via the condenser 24 that was connected between the cathode 8 and the grid 6 in accordance with this invention is represented by a vector $I_C$. It will be noted that this vector leads the voltage applied between the grid 6 and the cathode 8, $E_{g2}$, by 90°. The amount of current reaching the cathode 8 via the grid leak resistor 14 is negligible. Applying Kirchoff's law, the current $I_L$ flowing to the cathode 8 via the variable inductance 26 may be determined by subtracting $I_C$ from the total or resultant current $I_R$. Inasmuch as the reactance tube 28 is cathode coupled to the oscillator amplifier 2, the voltage $E_{g1}$ appearing across the inductance 26 is applied so as to modulate the current flowing in the reactance tube 28. This voltage $E_{g1}$ leads the current through the inductance 26 by an angle $\theta$ that is nearly 90° as indicated. Generally, the angle $\theta$ is less than 90° due to the fact that most inductances have a resistive component. With proper selection of the values of the inductance 26 and the condenser 24 that were added to the standard reactance tube Hartley oscillator combination in accordance with this invention, the current drawn by the reactance tube 28 can be made precisely 90° out of phase with respect to the current drawn by the oscillator through the tank circuit 10.

Although the 90° relationship is preferable, this arrangement makes it possible to adjust the angle within wide limits. In the circuits normally used for feeding back the oscillator voltage to the reactance tube, a 90° relationship between the voltage across the reactance tube and the voltage across the tank circuit can only be approached from one side. Actually, as pointed out above, it cannot actually be realized. The fact that this angle can be easily adjusted on either side of 90° makes it easy to adjust the angle at precisely 90°. Therefore, the reactance tube can be easily made to act as a pure reactance having no resistive component. In this particular arrangement the reactance tube acts as an inductance. Accordingly, no amplitude variations will appear in the output of the oscillator due to variations in the magnitude of the control voltage wave applied to the grid 32 of the reactance tube 28 from the source 36.

The voltage applied to the grid of the reactance tube is not reduced by the voltage divider action, as a larger portion of the current drawn by the oscillator passes through the inductance 26.

Figure 3:
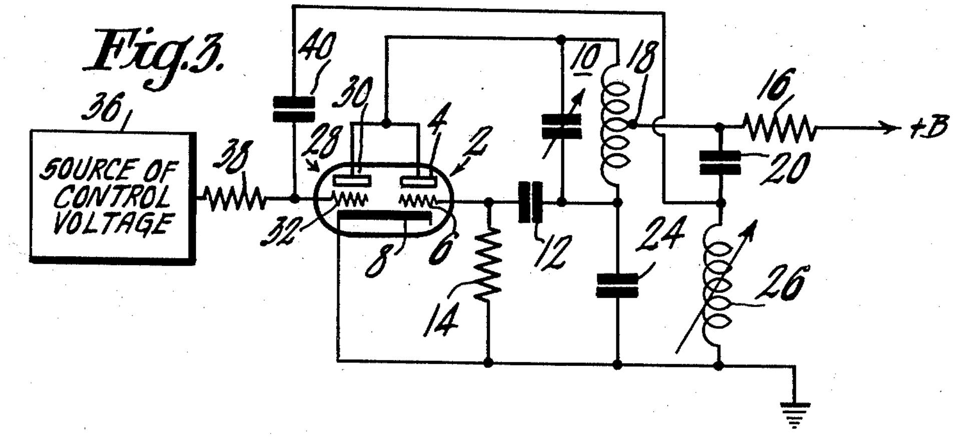
Figure 3 illustrates the application of the principles of this invention to a Hartley oscillator wherein the cathode of the oscillator tube is at ground potential.

Figure 3 illustrates the application of the principles of this invention to a Hartley oscillator wherein the cathode is grounded. This type of circuit is sometimes used to prevent hum from being introduced into the oscillator from the heater elements. However, no change in operation is introduced. For purposes of convenience, these components corresponding to the components of Figure 1 are indicated by the same numerals.

Figures 4, 5, 6, 7:
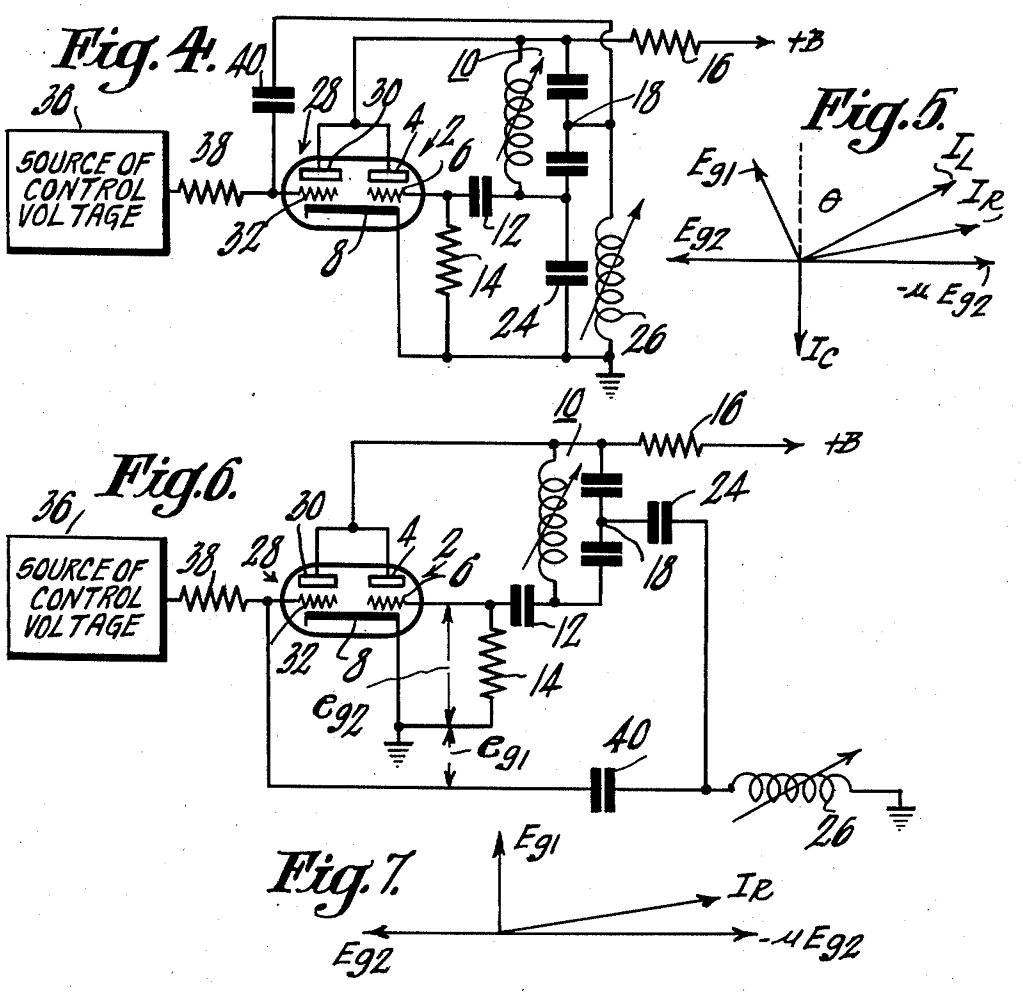
Figure 4 illustrates the application of the principles of this invention to a Colpitts oscillator.
Figure 5 is a vector diagram useful in the explanation of the operation of the embodiment of the invention shown in Figure 4.
Figure 6 illustrates another way in which the principles of this invention may be applied to a Colpitts oscillator.
Figure 7 is a vector diagram useful in the explanation of the operation of the embodiment of the invention shown in Figure 6.

The principles of this invention may also be applied to a Colpitts oscillator as shown in Figure 4 and explained in Figure 5. For purposes of simplicity, those components corresponding to components of Figures 1 and 3 will be indicated by the same numeral.

Figure 4 is similar to Figure 3 in that the cathode of the reactance and oscillator tubes are grounded. The only essential difference between the Colpitts type oscillator and the Hartley type oscillator is that the common cathode 8 of the reactance tube and the oscillator is coupled to an intermediate point on the capacitive branch of the tank circuit 10. This necessitates the use of two capacitors instead of one, as is well known to those skilled in the art. As has been well established by theory and practice, the current drawn by the Colpitts type oscillator generally leads its plate voltage. However, in this case we have inductance 26 which may alter the phase in the lagging direction so the resultant may be either leading, in phase, or lagging. This is indicated in the vector diagram of Figure 5 by the position of the resultant current vector $I_R$ with respect to the plate voltage vector $-\mu E_{g2}$. The current drawn through the condenser 24 to the cathode 8 of the oscillator tube 2 is indicated by the vector $I_C$. Subtracting this from the vector $I_R$ gives the current $I_L$ through the inductance 26. The voltage $E_{g1}$ across the inductance 26 is applied to the grid 32 of the reactance tube by a coupling condenser 40. The values of the condenser 24 and the inductance 26 have been chosen so that the currents $I_C$ and $I_L$ are related in such manner that the voltage $E_{g1}$ applied to the grid of the reactance tube leads the voltage at the plate of the oscillator tube $-\mu E_{g2}$ by more than 90°. This is done for purposes of illustrating the amount of control over this phase relationship that may be attained by using the principles of this invention.

In the embodiments of the invention previously discussed, a portion of the plate current of the oscillator amplifier 2 is passed through the condenser 24 and the remainder is passed through the inductance 26. In the embodiment of the invention shown in Figure 6, however, the condenser 24 and the variable inductance 26 are connected in series between an intermediate point in the capacitive branch of the resonant circuit of a Colpitts oscillator and the cathode of the oscillator amplifier 2. It is not believed necessary to again describe the standard components of the Colpitts oscillator, as they are the same as those shown in Figure 4. For purposes of convenience, however, corresponding components have been indicated by the same numerals.

There is, however, a distinct advantage to the arrangement of Figure 6. It will be noted that the condenser 24 and inductance 26 are connected in series. Therefore, if they are tuned to resonate near the oscillator frequency a large increase in voltage may be developed across the inductance 26 and applied to the grid 32 of the reactance tube. This greatly increases the sensitivity of the frequency control. The use of the condenser 24 as shown in Figure 6 makes the design of the circuit somewhat simpler, but it can be eliminated in a Colpitts circuit such as that shown. The reason for this is that the B+ voltage is not shunted to ground due to the tuning condensers on either side of the intermediate point 18. The resonant action noted above can still be obtained by suitably choosing the values of the tuned circuit and the value of the variable inductance 26.

The vector diagram of Figure 7 relates to Fig. 6. It needs little explanation as the nomenclature is the same as the vector diagrams previously discussed. The resultant current drawn by the oscillator amplifier 2 is again represented by $I_R$. The circuit of Figure 6 is a Colpitts type oscillator $I_R$ leads the plate voltage represented by the vector $-\mu E_{g2}$. In this embodiment, however, the current $I_R$ flows through both the condenser 24 and the inductance 26. The voltage across the inductance 26 leads this current by an angle $\theta$ and is represented by the vector $E_{g1}$. This voltage $E_{g1}$ is applied to the grid 32 of the reactance tube 28 and, as can be seen from the diagram of Figure 6, is 90° away from the oscillator grid voltage $E_{g2}$. In this circuit no consideration need be given in the current flowing through the condenser 24, as it is identical with the current flowing through inductance 26. As the inductance 26 is varied so that the combination of the condenser 24 and the inductance 26 passes from one side of resonance to the other, the angle $\theta$ between the vector $I_R$ and $E_{g1}$ may be varied by large amounts. Even though the value of the inductance 26 is not such as to be precisely at series resonance with the condenser 24, it can be closely approximated and still have a large amount of control over the angle $\theta$.

Figure 8:
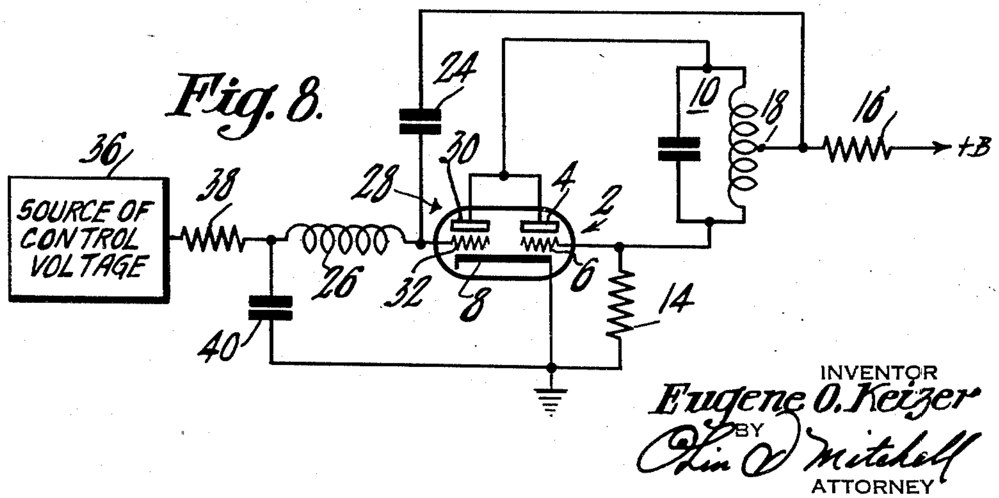
Figure 8 shows another way of applying this invention to a Hartley oscillator.

Figure 8 illustrates the application of the principles of the invention to a Hartley type oscillator wherein the reactive circuit elements are connected in series as was done in the arrangement of Figure 6. Here the condenser 24 is connected between an intermediate point on the inductive branch of the resonant circuit 10 and the grid 32 of the reactance tube 28. The inductance 26 is connected between the grid 32 and the common cathode 8. The condenser 40 merely serves to bypass the $R_F$ energy from the oscillator around the source of control voltage 36. The vector diagram explaining the operation of the circuit of Figure 8 would be similar to that of Figure 7 with the exception that the resultant current $I_R$ drawn by the oscillator amplifier 2 would lag the plate voltage vector $-\mu E_{g2}$.

Figure 9:
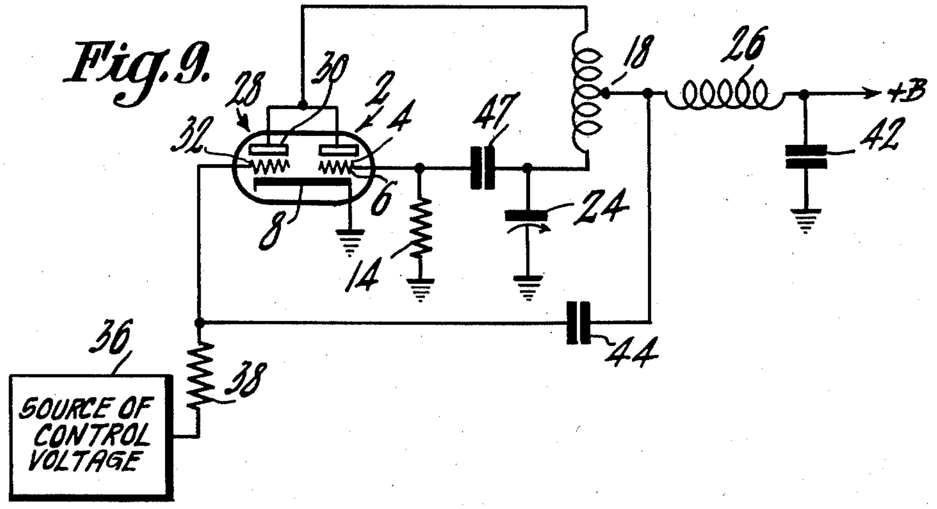
Figure 9 illustrates one variation in the application of this invention to a Hartley oscillator.

Various other circuit arrangements may be derived from the basic concept of this invention. For example, in the Hartley oscillator circuit of Figure 9 the inductance 26 is connected in the B+ lead. The B+ side of the inductance 26 is connected to $R_F$ ground by a suitable bypass condenser 42. The voltage at the other end of the inductance 26 is coupled to the grid 32 of the reactance tube 28 via coupling condenser 44. A portion of the oscillator current is bypassed to the common cathode 8 by the condenser 24. The operation of the circuit of Figure 9 is therefore similar to any of the Hartley type circuits discussed above. The only difference is in the position of the coil 26.

In all of the arrangements discussed above the current through the reactance tube 28 has been leading the voltage across the resonant circuit 10 of the oscillator. Therefore, the reactance tube simulates a capacitance connected across the resonant circuit 10. By interchanging the condenser 24 and the inductance 26, it is possible to make the reactance tube 28 draw current that lags the voltage across the resonant circuit 10. Thus, the reactance tube can be made to act as an inductance in parallel with the resonant circuit 10. In doing this, however, the magnitudes of the impedances of the condenser 24 and the inductance 26 should be interchanged.

Figure 10:
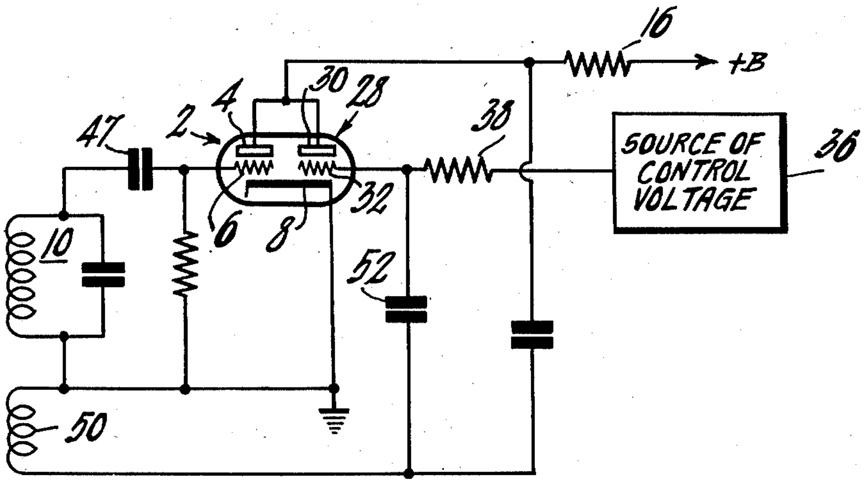
Figure 10 illustrates the application of this invention to a type of oscillator employing a tickler coil.

Figure 10 illustrates the application of the principles of this invention to the type of oscillator employing tickler coils. This arrangement is useful where variations in oscillator amplitude as a function of the value of the control voltage employed can be tolerated. For the sake of convenience. components having the same functional relationship as those discussed in the previous figures will be indicated by the same numerals.

It is well known to those skilled in the art that the tank circuit 10 in this type of oscillator may be coupled between the grid 6 of the oscillator tube 2 and the common cathode 8. A tickler coil 50 that is inductively coupled to the inductance of the resonant circuit 10 is connected between the cathode 8 and the plate of the oscillator tube 2. The voltage developed across the tickler coil 50 is coupled to the grid 32 of the reactance tube 28 via coupling condenser 52.

Having thus described my invention, what is claimed is:

1. An apparatus for controlling the frequency of an oscillator comprising in combination a first amplifier having at least a plate, a grid and a cathode, a resonant circuit connected between said grid and said plate, a first reactive element coupled between said grid and said cathode, a second reactive element coupled between an intermediate point in said resonant circuit and said cathode, a second amplifier having a grid, said second amplifier being connected in parallel with at least a portion of said resonant circuit, means for changing the gain of said second amplifier, and means for applying the voltage across said second reactive element to the grid of said second amplifier.

2. Frequency control apparatus comprising in combination a first amplifier having a plate, a control grid and a cathode, a parallel resonant circuit coupled between said plate and said grid, a reactive impedance connected between an intermediate point of said tank and said cathode, a different type of reactive impedance coupled between said grid and said cathode, a reactance tube having a control electrode the reactance tube being connected across at least a portion of said parallel resonant circuit and means for coupling said intermediate point to the control electrode of said reactance tube.

3. Apparatus for controlling the frequency of an oscillator comprising in combination a first emplifier having at least a plate, a cathode and a grid, a parallel resonant circuit connected between said grid and said plate, a capacitance and an inductance connected in series between an intermediate point in said resonant circuit and said cathode, a second amplifier connected in parallel with at least a portion of said resonant circuit, a grid associated with said second amplifier, and coupling circuits for applying the voltage appearing across said inductance to said latter grid.

4. Apparatus for controlling the frequency of an oscillator comprising in combination a first amplifier having at least a plate, a cathode and a grid, a parallel resonant circuit connected between said grid and said plate, a capacitance and an inductance connected in series between an intermediate point in said resonant circuit and said cathode, a second amplifier connected in parallel wtih at least a portion of said resonant circuit, a grid associated with said second amplifier, and coupling circuits for applying the voltage appearing across said capacitance to said latter grid.

5. An oscillator, a resonant circuit coupled to said oscillator so as to control its frequency, a reactance tube, said reactance tube having electrodes for controlling its conduction, a condenser and an inductance connected in series, the values of said condenser and inductance being such that they are in series resonance at the frequency of the oscillator, said series combination being connected between an intermediate point of said resonant circuits and one of said electrodes, and means for coupling a point between said inductance and condenser to another control electrode so that the voltage across one half said series combination controls the conduction of said reactance tube.

EUGENE O. KEIZER.

References Cited in the file of this patent

UNITED STATES PATENTS

| Number | Name | Date |
|---|---|---|
| 2,351,368 | Roberts | June 13, 1944 |
| 2,408,192 | Bell et al. | Sept. 24, 1946 |
| 2,520,823 | Bach | Aug. 29, 1950 |
| 2,530,165 | Hugenholtz et al. | Nov. 14, 1950 |
| 2,541,649 | Hepp | Feb. 13, 1951 |